(No Model.)
H. A. GORE.
STAPLE PULLER.
No. 277,420. Patented May 8, 1883.
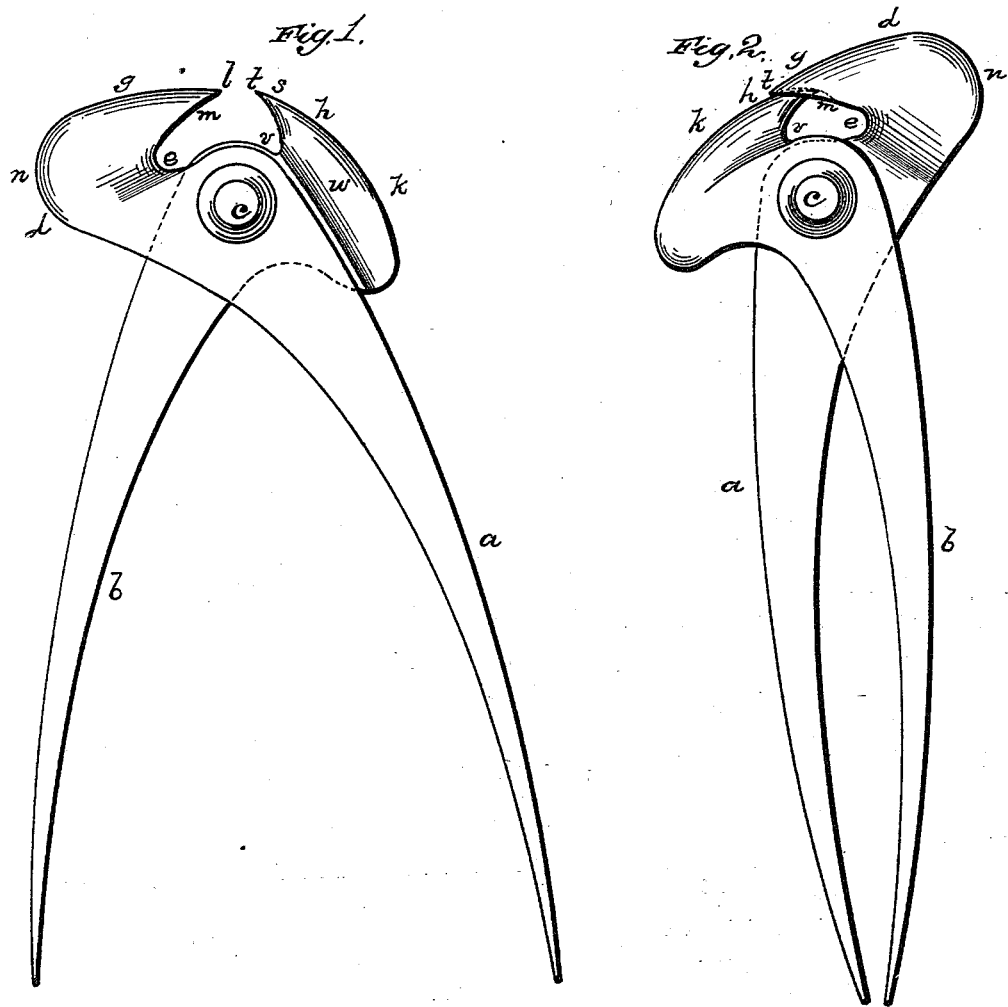
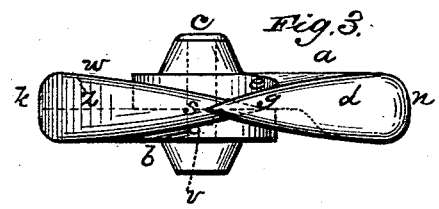
WITNESSES
E. H. Bates.
Philip C. Masi.
INVENTOR
Henry A. Gore,
by Anderson & Smith
his ATTORNEYS

UNITED STATES PATENT OFFICE.

HENRY A. GORE, OF GOSHEN, INDIANA, ASSIGNOR OF ONE-HALF TO DE ALTON DICKINSON, OF GRANT, IOWA.

STAPLE-PULLER.

SPECIFICATION forming part of Letters Patent No. 277,420, dated May 8, 1883.

Application filed February 24, 1883. (No model.)

*To all whom it may concern:*

Be it known that I, HENRY A. GORE, a citizen of the United States, and a resident of Goshen, in the county of Elkhart and State of Indiana, have invented certain new and useful Improvements in Staple-Extractors; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a view of one side of my extractor. Fig. 2 is a view of the opposite side, and Fig. 3 is a top view.

This invention has relation to staple-extractors especially designed for use in taking out the staples of wire fences; and it consists in the construction and novel arrangement of a pair of lever-jaws pivoted together and having respectively a wedge-form inwardly-projecting tooth, the inner surface of which is broad and curved from the pivotal center, and a wedge-shaped inwardly-projecting tooth of rounded contour, the outer surface of which is curved from the pivotal center, and moves in contact with the inner surface of the opposite tooth first mentioned, all as hereinafter set forth.

In the accompanying drawings, the letters $a$ and $b$ designate the two jaw-levers, which are pivoted together at $c$. The lever $a$ is formed with a jaw-head, $d$, having a recess or rounded notch, $e$, between the pivotal portion and the wedge-form tooth $g$, which projects inward or toward and over the tooth $h$ of the opposite jaw, $k$. The point $l$ of the tooth $g$ is rounded and somewhat flattened on the inner side, and the inner edge, $m$, of this tooth is made broad, and may be slightly concave transversely, and it is circularly curved from the pivotal center. The jaw $d$ is usually formed with a cam-like or fulcrum projection, $n$, extending outwardly and having a rounded contour, as shown in the drawings. The tooth $h$ of the opposite jaw $k$ projects toward the jaw $d$ and under its tooth $g$, which, when the jaws are closed, overlaps the tooth $h$, and is in contact therewith throughout the lapped portion, as the outer surface of the tooth $h$ is circularly curved, as indicated at $s$, from the pivotal center. In order to give the tooth $h$ sufficient swell from the point $t$ outward, it is expanded laterally as well as from the inside outward. Between the tooth $h$ and the pivotal portion is a recess or notch, $v$. In forming the lateral swell $w$ of the tooth $h$ it is made on the same side of the jaw which is in contact with the opposite jaw at the pivotal portion. The swell of the jaw $k$ is of rounded contour, and, as it extends outward from the overlapped portion $s$, gradually expands from the pivotal center to form a cam-like extension or rocking fulcrum, $z$.

In operating this device the wedge-form points $l$ and $t$ are placed obliquely on opposite sides of the staple and on opposite sides of the wire held thereby, closely against the post or support into which the staple is driven. The jaws are then closed, forcing the teeth $g$ and $h$ toward and by each other, under the wire, and through the staple, so that the latter is forcibly lifted out of the post or support.

Having described this invention, what I claim, and desire to secure by Letters Patent, is—

A staple-extractor consisting of a pair of lever-jaws pivoted together, and having, respectively, a wedge-form inwardly-projecting tooth, $g$, the inner surface of which is broad and curved from the pivotal center, and a wedge-shaped inwardly-projecting tooth, $h$, of rounded and laterally-swelled contour, the outer surface of which is curved from the pivotal center to move in contact with the inner surface of the opposite tooth, substantially as specified.

In testimony whereof I affix my signature in presence of two witnesses.

HENRY A. GORE.

Witnesses:
 ISAAC A. SIMMONS,
 E. L. BILLINGS.